United States Patent
McCloskey

(10) Patent No.: US 8,199,226 B2
(45) Date of Patent: Jun. 12, 2012

(54) METHODS AND SYSTEMS FOR CAPTURING AN IMAGE OF A MOVING OBJECT

(75) Inventor: Scott McCloskey, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 102 days.

(21) Appl. No.: 12/886,638

(22) Filed: Sep. 21, 2010

(65) Prior Publication Data

US 2012/0069225 A1 Mar. 22, 2012

(51) Int. Cl.
*H04N 9/64* (2006.01)
*H04N 5/228* (2006.01)
*G06K 9/40* (2006.01)
*G06K 9/00* (2006.01)

(52) U.S. Cl. .......... 348/248; 348/222.1; 348/208.14; 348/208.16; 382/254; 382/255; 382/103; 382/275; 382/274

(58) Field of Classification Search .......... 348/241, 348/243, 208.14, 208.4, 208.13, 169, 170, 348/171, 172, 699–702, 208.99–208.16, 348/248; 382/254, 255, 264, 103

See application file for complete search history.

(56) References Cited

U.S. PATENT DOCUMENTS

| | | | |
|---|---|---|---|
| 2007/0258707 A1* | 11/2007 | Raskar | 396/52 |
| 2010/0246989 A1* | 9/2010 | Agrawal et al. | 382/255 |
| 2011/0050919 A1* | 3/2011 | Albu et al. | 348/208.6 |

OTHER PUBLICATIONS

A. Agrawal et al., "Invertible Motion Blur in Video"—ACM Trans. Graph., vol. 28(3), article 95 (Aug. 2009—New York/NY).*
Agrawal et al., "Resolving Objects at Higher Resolution from a Single Motion-blurred Image"—2007 IEEE Conf. Comp. Vision and Pattern Recognition (Jun. 17-22, 2007—Minneapolis/MN).*
R. Raskar et al., "Coded Exposure Photography: Motion Dblurring using Fluttered Shutter"—J. ACM Transac on Graphics (TOG)—Proc. of ACM Siggraph, p. 795, vol. 25(3) (Jul. 2006—New York/NY).*

* cited by examiner

*Primary Examiner* — Lin Ye
*Assistant Examiner* — Marly Camargo
(74) *Attorney, Agent, or Firm* — Luis M. Ortiz; Kermit D. Lopez; Melissa Asfahani

(57) ABSTRACT

Methods and systems for capturing an image of a moving subject employ a camera image sensor that captures a blurred image of a moving subject. In-capture positions of the moving object are also determined using a high frame rate camera or other motion sensing device. The PSF for controlling modulation of the light hitting the camera image is successively updated by selecting, from among a plurality of pre-computed invertible PSFs, a pre-computed invertible PSFs for each estimated motion of the moving object. Light hitting the camera image sensor is modulated in capture phase according to one or more of the updated pre-computed invertible PSFs such that the captured blurred image is invertible. The resulting invertible blurred image can be de-blurred using the selected known PSFs to provide a substantially sharp image.

20 Claims, 7 Drawing Sheets

METHODS AND SYSTEMS FOR CAPTURING AN IMAGE OF A MOVING OBJECT

STATEMENT OF GOVERNMENT RIGHTS

The invention disclosed in this application was made with Government support under Contract Number W911NF-10-C-0022 awarded by the Intelligence Advanced Research Projects Activity. The Government has certain rights in the invention.

TECHNICAL FIELD

Embodiments generally relate to methods and systems for capturing and processing images. Embodiments also relate to methods and systems for deblurring images. Embodiments additionally relate to software or hardware modules for implementing such methods.

BACKGROUND OF THE INVENTION

Acquiring sharply-focused images of moving people or objects is a fundamental and challenging problem in several applications. In many applications, but particularly in iris and iris image capture, subject/target motion is a complicating factor. In moderate lighting environments (e.g. indoors), the long exposure times required to generate a clear image limits the range of subject velocities that can be tolerated. For higher subject velocities, motion blur in the captured image may prevent exploitation, e.g. iris recognition.

For applications such as iris recognition, wherein fine scale features are essential to proper classification, the use of a traditional shutter imposes some fundamental limits on the extent of motion blur that can be tolerated. Motion blur, as through a traditional shutter, is equivalent to convolution of a sharply-focused image with a box filter. Motion-blurred images of this type lack information regarding the object at a number of spatial frequencies. This lack of information is irreversible and no post processing can recover it from the image. Methods that attempt to deblur the image will severely amplify sensor noise, hallucinate content, or both. Though it may be useful in improving subjective image quality, hallucinating image content is counter-productive for forensic applications, and amplifying noise complicates iris matching.

To avoid this loss of information during image capture, some prior art approaches have advocated the use of a fluttering shutter and demonstrated the ability to recover high-quality images despite blur from moving objects. During exposure, the camera's shutter flutters between open and closed while exposure is accumulated. This produces an image with coded blur which, unlike traditional blur, conveys information about the subject at all spatial frequencies. Given a suitably designed processing method that is based on the shutter's fluttering pattern, deblurring recovers an image with low levels of noise while avoiding reconstruction artifacts.

Researchers have developed methods to mitigate motion blur post-capture, including the flutter shutter technique. Note that a non-limiting example of a flutter shutter camera and flutter shutter technology in general is disclosed in U.S. Patent Application Publication No. US2007/0258707A1, entitled "Method and Apparatus for Deblurring Images, "which published to Ramesh Raskar on Nov. 8, 2007 and is incorporated herein b reference. Another non-limiting example of a flutter shutter camera and flutter shutter technology is disclosed in U.S. Patent Application Publication No. US2007/0258706A1, entitled "Method for Deblurring Images Using Optimized Temporal Coding Patterns," which published to Ramesh Raskar, et al on Nov. 8, 2007, and is incorporated herein by reference.

There is a need to provide improved systems and methods that are capable of acquiring sharp images of subjects despite subject motion.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for methods and systems for capturing images with invertible motion blur.

It is another aspect of the present invention to provide methods and systems for real-time shutter control for invertible motion blur.

Aspects and other objectives and advantages can now be achieved as described herein. According to one aspect, a method for capturing an image of a moving subject is provided. The method can comprise providing a plurality of pre-computed invertible PSFs searchable at rates of in-capture motion; capturing, using a camera image sensor, a blurred image of a moving subject; sensing a rate of in-capture motion of the subject; estimating the rate of in-capture motion of the subject from the sensing, successively updating in-capture positions of the moving subject based on the estimation of in-capture motion; selecting, from among the plurality of pre-computed invertible PSFs, a pre-computed invertible PSFs for each estimated position of the moving object; and modulating light integrated by the camera image sensor according to one or more of the updated pre-computed invertible PSFs such that the captured blurred image is invertible. The method can further comprise deblurring the invertible blurred captured image to provide a sharp image. The method can yet further comprise successively updating an estimated PSF for controlling modulation of the camera image sensor to correspond to each selected pre-computed invertible PSF.

According to another aspect, a system for capturing an image of a moving subject is provided. The system can comprise a processor; a data bus coupled to the processor; and a computer-usable medium embodying computer code, the computer-usable medium being coupled to the data bus, the computer program code comprising instructions executable by the processor and configured for: providing a plurality of pre-computed invertible PSFs searchable at rates of in-capture motion; capturing, using a camera image sensor, a blurred image of a moving subject; sensing a rate of in-capture motion of the subject; estimating the rate of in-capture motion of the subject from the sensing, successively updating in-capture positions of the moving subject based on the estimation of in-capture motion; selecting, from among the plurality of pre-computed invertible PSFs, a pre-computed invertible PSFs for each updated position of the moving object; and modulating light hitting the camera image sensor according to one or more of the updated pre-computed invertible PSFs such that the captured blurred image is invertible. The instructions executable by the processor can be further configured for successively updating an estimated PSF for controlling modulation of the camera image sensor to correspond to each selected pre-computed invertible PSF.

According to yet another aspect, a computer-usable medium for capturing an image of a moving subject is provided. The computer-usable medium embodies computer program code. The computer program code can comprise computer executable instructions configured for: providing a plurality of pre-computed invertible PSFs searchable at rates of in-capture motion; capturing, using a camera image sensor, a blurred image of a moving subject; sensing a rate of in-capture motion of the subject; estimating the rate of in-capture motion of the subject from the sensing, successively updating in-capture positions of the moving subject based on the estimation of in-capture motion; selecting, from among the plurality of pre-computed invertible PSFs, a pre-computed invertible PSFs for each updated position of the moving object; and modulating light hitting the camera image sensor according to one or more of the updated pre-computed invertible PSFs such that the captured blurred image is invertible. The instructions can be further configured to successively updating an estimated PSF for controlling modulation of the camera image sensor to correspond to each selected pre-computed invertible PSF.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
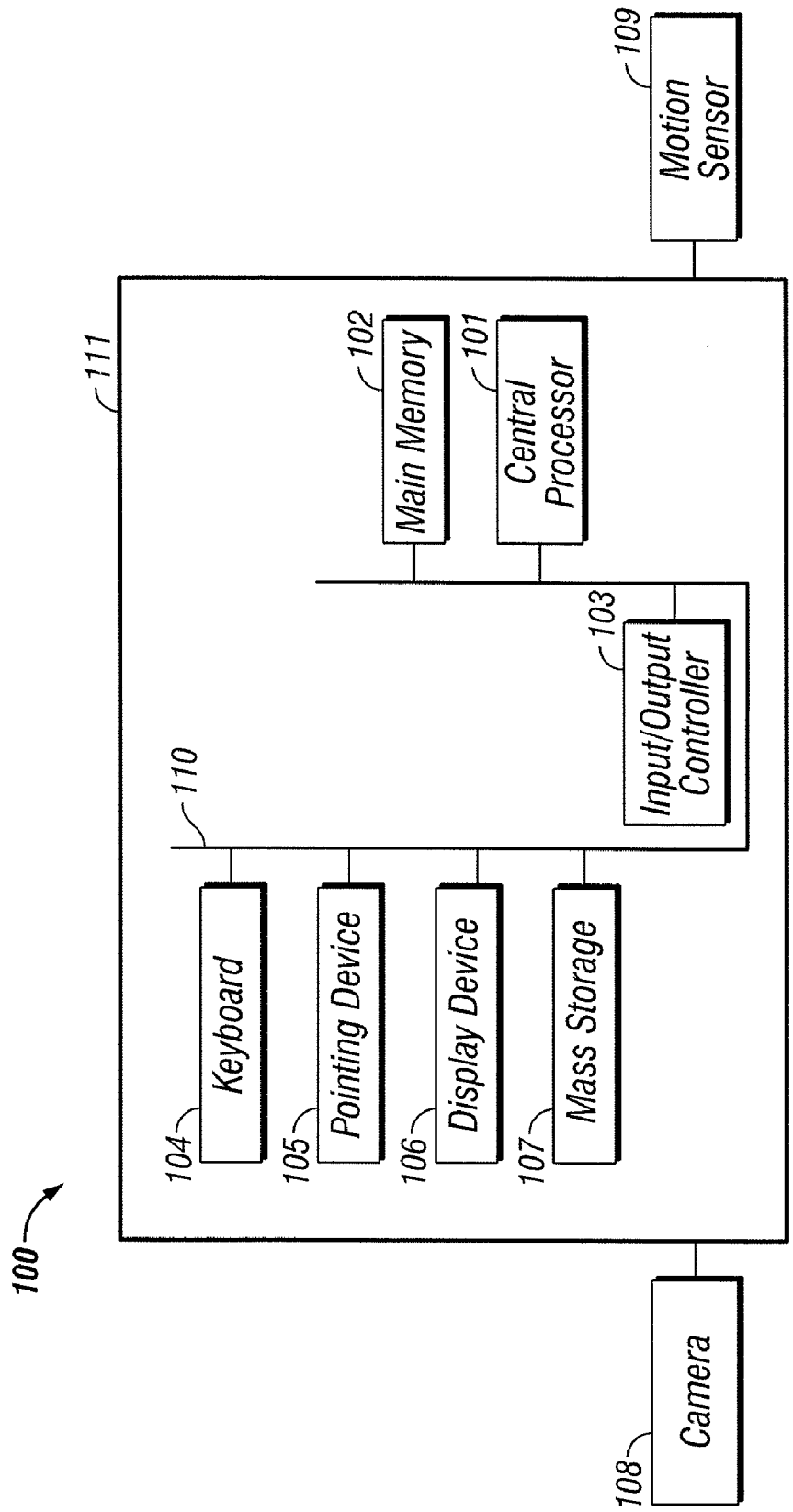
FIG. 1 illustrates a schematic view of system for capturing an image of a moving subject according to one implementation.
Figure 2:
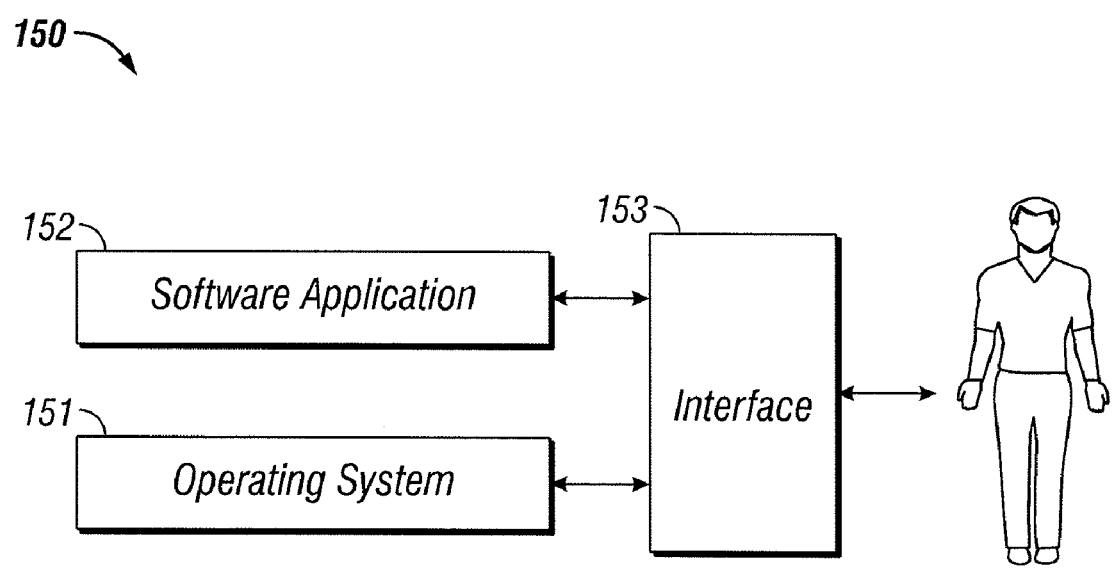
FIG. 2 illustrates a schematic view of a software system including an operating system, application software, and a user interface for carrying out the present invention.
Figure 3:
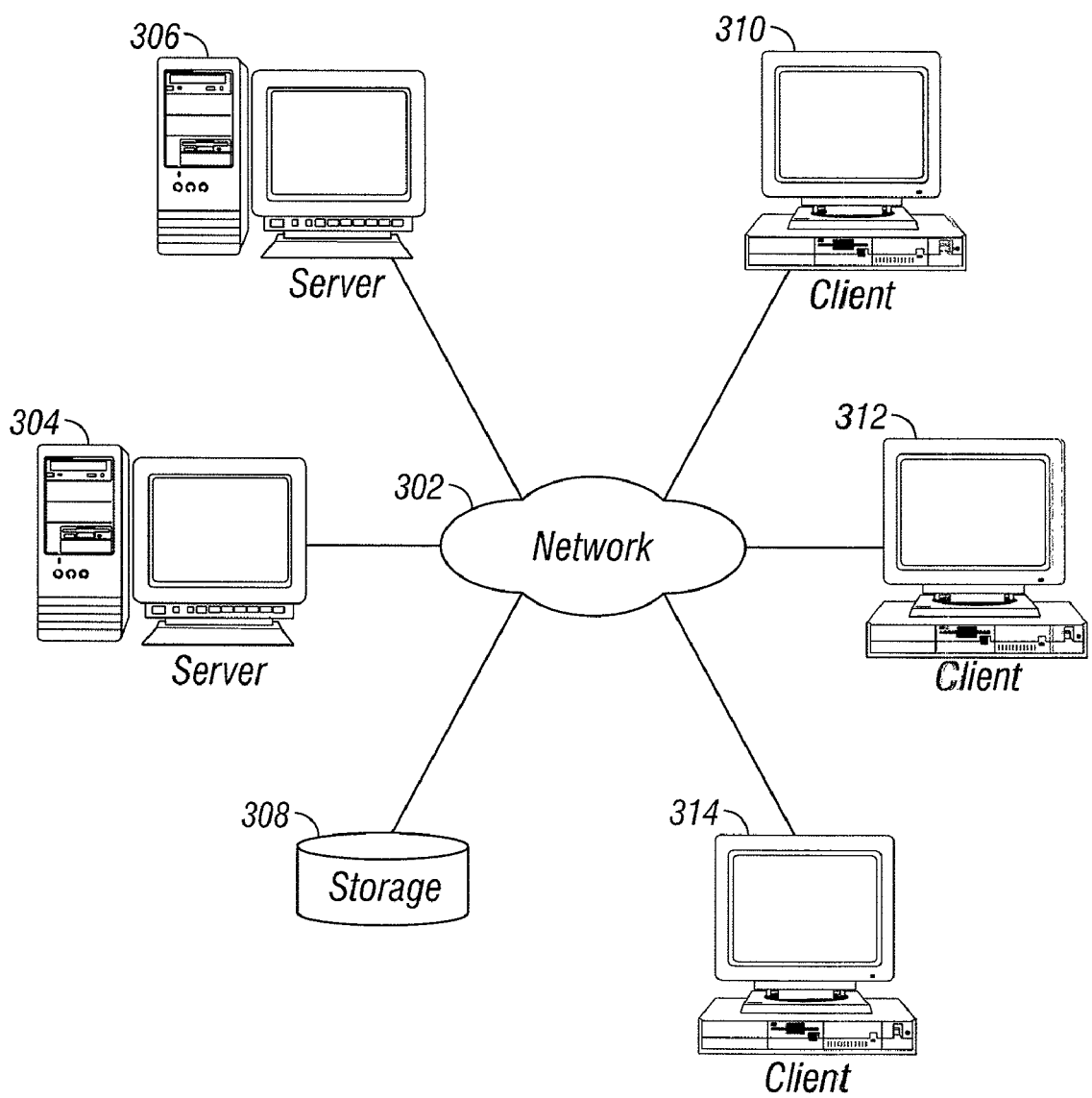
FIG. 3 illustrates a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing system 100 comprising, for example, a computer system 111, camera 108 and motion sensing device 109. Computer system 111 has a central processor 101, a main memory 102, an input/output controller 103, a keyboard 104, a pointing device 105 (e.g., mouse, track ball, pen device, or the like), a display device 106, and a mass storage component 107 (e.g., hard disk).

Camera 108 may be employed to communicate with computer system 111. Camera 108 can be implemented as, for example, a flutter shutter camera, which may be employed in the context of a biometric authentication system such as, for example, an iris and/or facial biometric recognition system or device. A flutter shutter camera can be configured as a camera capable of capturing moving objects at an exposure time of, for example, over 50 milliseconds, like high speed motion cameras. Using a coded exposure sequence, the flutter shutter camera can recover, for example, text from a speeding car and sharpen images. Motion sensing device 109 can also communicate with computer system 111. Motion sensing device 109, which can be for example a High Frame Rate Camera, is configured to capture images of the moving object for estimating the rate/positions of motion of the moving object. Motion sensing devices other than a high frame rate camera may be employed. For example, a Light Detection and Ranging (LIDAR) system can be utilized. The camera 108 and/or motion sensing device 109 can be located locally either proximate to or integrated with the computer system 111. Alternatively, the camera 108 and/or motion sensing device 109 can be located remotely from the computer system 111. As illustrated, the various components of the data-processing system 100 communicate through a system bus 110 or similar architecture.

FIG. 2 illustrates a computer software system 150 for directing the operation of the data-processing system 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), can also serve to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operating systems such as, for example, Linux may also be employed with respect to the operating system 151 and interface 153. Application module 152, on the other hand, can include instructions such as the various operations described herein with respect to the various components and modules described herein such as, for example, the method 400 depicted in FIG. 4.

FIG. 3 illustrates a graphical representation of a network of data processing systems in which aspects of the present invention may be implemented. The network data processing system can be provided as a network of computers in which embodiments of the present invention may be implemented. The network data processing system contains network 302, which can be utilized as a medium for providing communications links between various devices and computers connected together within the network data processing system. Network 302 may include connections such as wired, wireless communication links, fiber optic cables, USB cables, Ethernet connections, and so forth.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. The network data processing system may include additional servers, clients, and other devices not shown. Specifically, clients may connect to any member of a network of servers which provide equivalent content.

In some embodiments, the network data processing system may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, the network data processing system may also be implemented as a number of different types of networks such as, for example, a secure intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data processing system such as system 100, computer software system 150, network data-processing system, and network 302 depicted in FIGS. 1-3. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

At a high level, the system retains a set of (pre-computed) point spread functions (PSFs) that are known to be invertible. During capture of an image, given in-capture motion estimates, the system modulates light integrated by the sensor (e.g., by opening and closing the shutter) in order to produce *invertible* motion blur in the captured image. Post-capture, this image is processed in order to estimate the sharp texture.

A method for capturing a moving object according to one embodiment will now be described in more detail. The method 400, which is outlined in the flow chart of FIG. 4, may be implemented for example in the system of FIG. 1. Method 400 of FIG. 4 will be described with reference to FIGS. 5-7, which illustrate operation of the system of FIG. 1 in pre-capture mode, capture mode, and post-capture mode, respectively.

Figure 4:
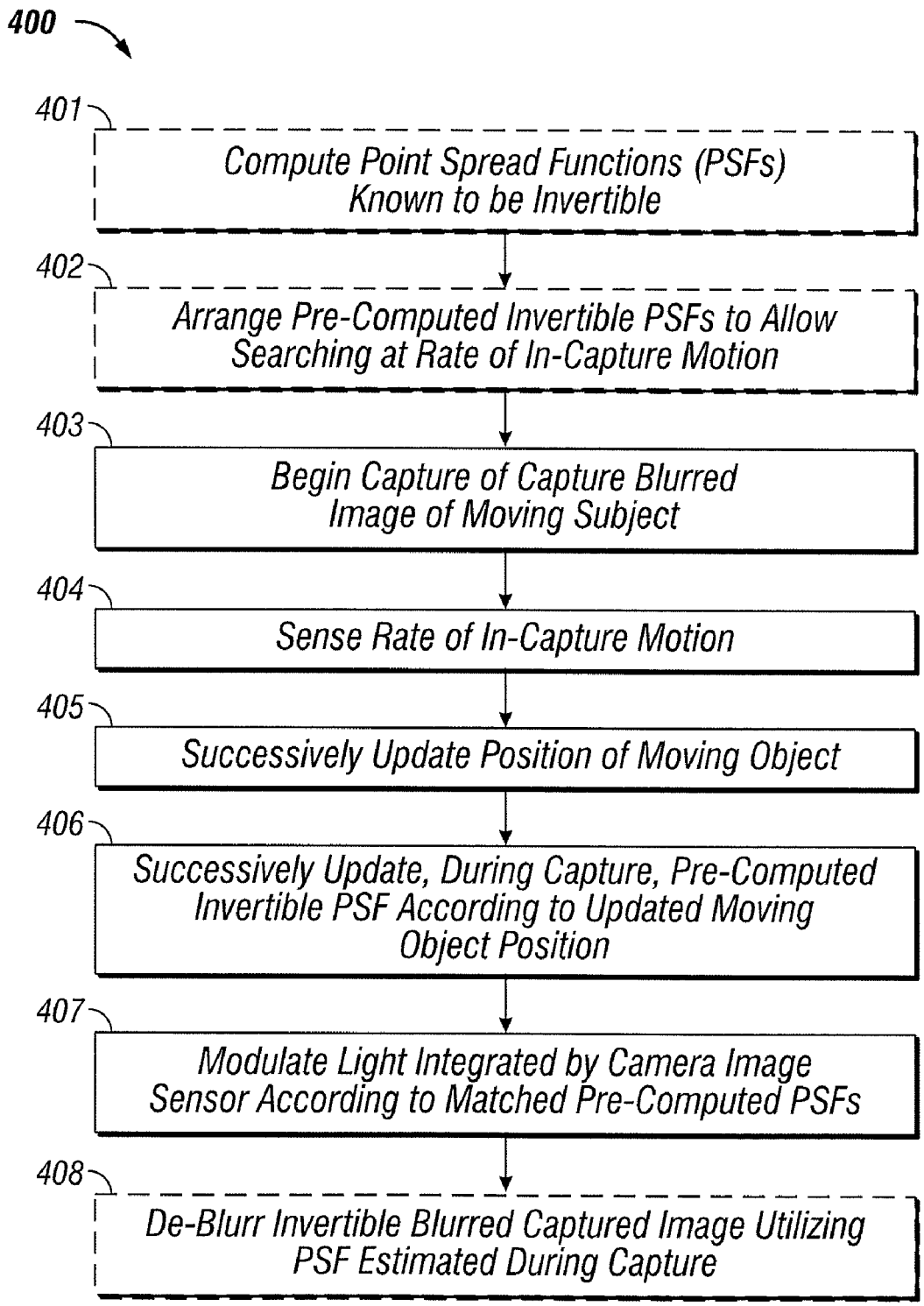
FIG. 4 illustrates a high-level flow chart of operations depicting logical operational steps of a method for capturing an image of a moving subject according to one embodiment.
Figure 5:
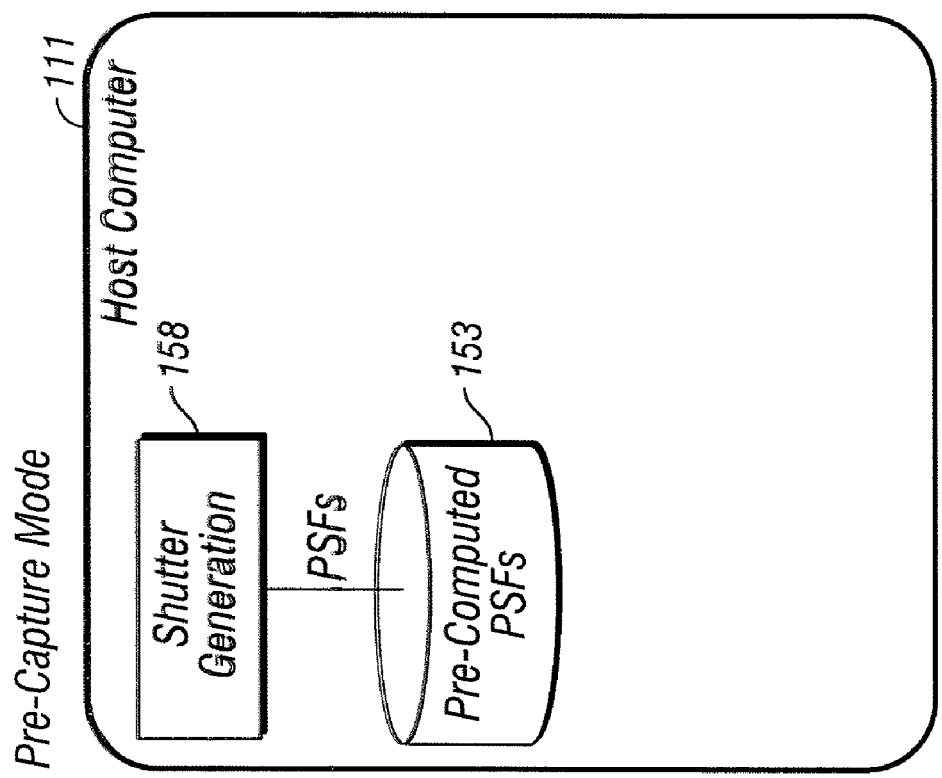
FIGS. 5-7 illustrate an example implementation of the method of FIG. 4 in the system of FIG. 1.

As indicated in the method of 400 of FIG. 4, a number of point spread functions (PSFs) known to be invertible are initially computed in pre-capture phase (401). Computer system 111 achieves this in pre-capture mode by shutter generation, i.e. an algorithm that computes PSFs which satisfy conditions on blur invertibility 158 (see FIG. 5). The pre-computed PSFs are arranged or organized (e.g. using a prefix tree) in such a way as to allow for a search at the rate of the in-capture motion estimation (402). The arranged pre-computed PSFs are stored as data 153 in computer system 111 (FIG. 5).

Figure 6:
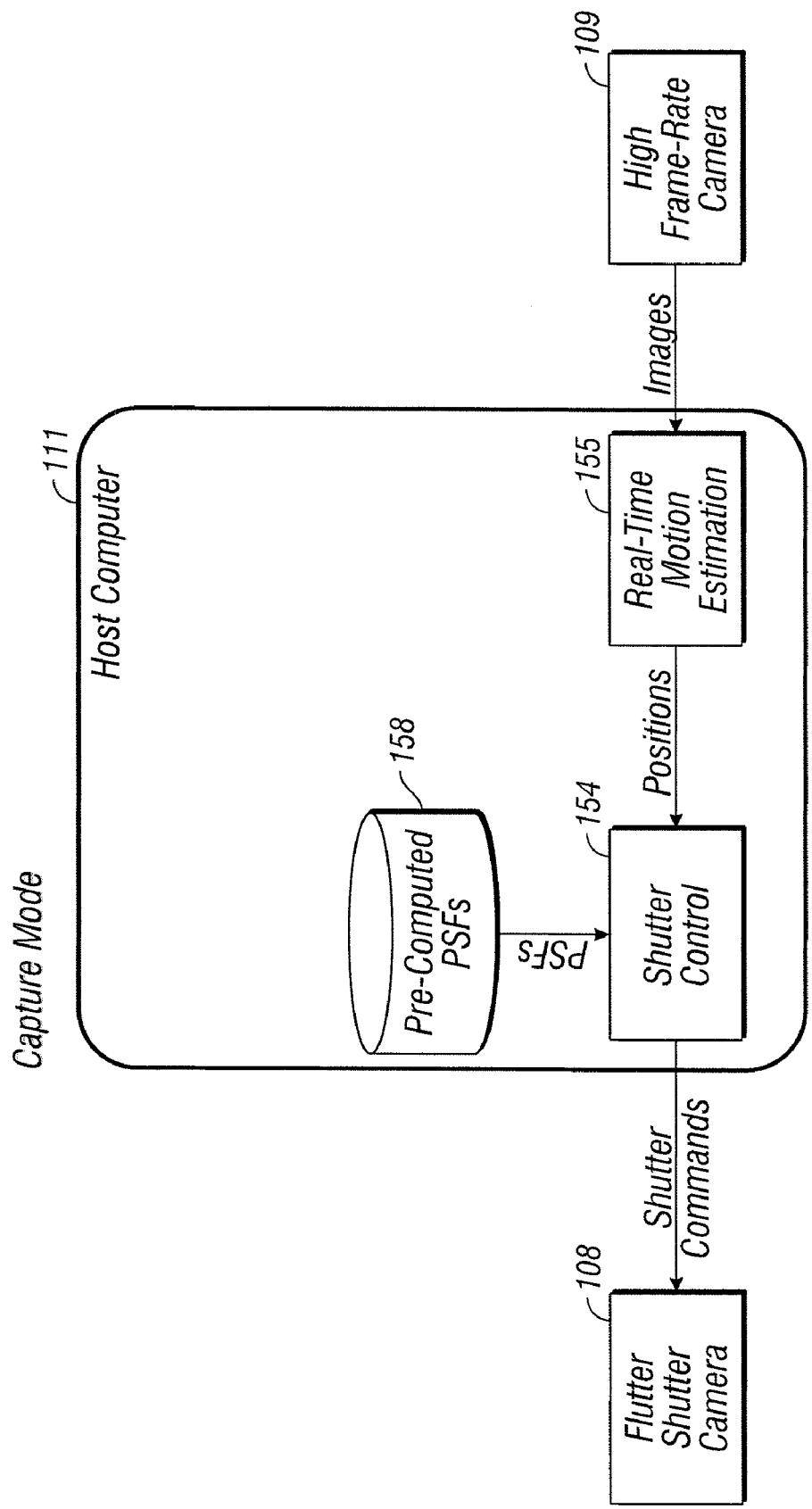

A blurred image of the moving subject is captured (403). As shown in FIG. 6, this is achieved in system 100 by a flutter shutter camera 108 capturing the blurred image. The rate of in-capture motion is determined (404). In system 100, the high frame rate camera 109 captures images of the moving subject and a real-time estimation module 155 of the software performs in-capture motion estimations based on the images captured by the high frame rate camera 109. The position of the moving subject is successively updated based on the in-capture motion estimations (405). During capture, the pre-computed invertible PSFs are utilized to control modulation of the camera image sensor, and the estimated PSF in the blurred image is successively updated according to the updated moving object position and the shutter state during the capture time (406). System 100 achieves this by feeding the calculated moving object positions to the shutter control software module 154 which uses the received calculated moving object positions to select and retrieve the corresponding pre-computed PSFs from storage (FIG. 6).

Light integrated by the camera image sensor is modulated according to the successively updated pre-computed PSFs (407). In system 100, during exposure of the moving subject by the flutter shutter camera, each position update (from the in-capture motion estimation) is taken, along with the current PSF and the collection of invertible PSFs, in order to decide whether the shutter should be opened or closed, whether the light should be integrated by the sensor, or whether the opacity of an optical element (an LCD panel, for example) should be modulated. Exposure terminates when the shutter and LCD panel have been open long enough to result in the required exposure (FIG. 6)

Figure 7:
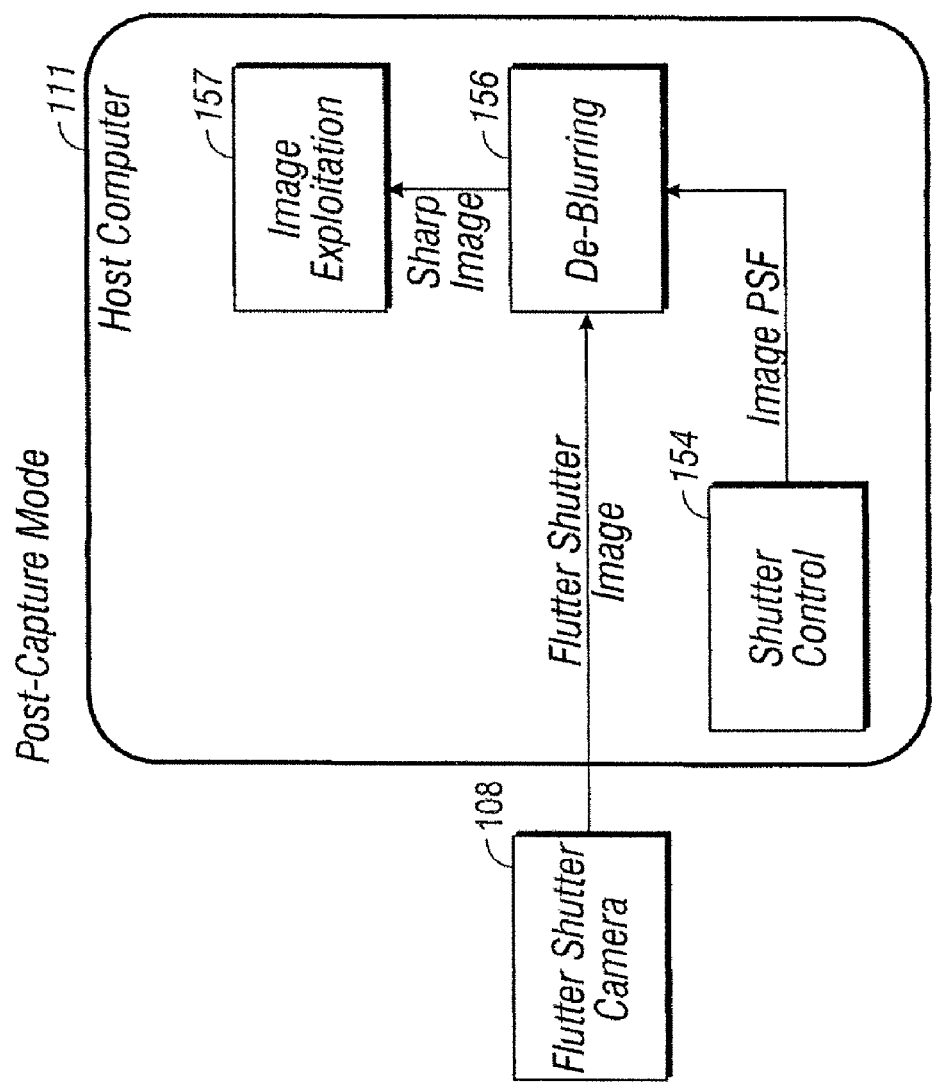

As indicated in FIG. 4, the captured invertible blurred image is deblurred utilizing the PSF estimated determined during capture (408). In system 100, post capture, the flutter camera 108 sends the flutter shutter image to a de-blurring software module 156 which deblurs the image using the corresponding known PSF as estimated during exposure and supplied by the shutter control module 154, as shown in FIG. 7.

After the image is de-blurred post capture using the known PSFs as estimated during exposure, the de-blurred image is passed along for subsequent analysis (e.g. iris matching, barcode decoding).

Hitherto now, one of the shortcomings of the flutter shutter approach was that, in order to ensure that motion blur was invertible (that is, ensure that the underlying sharp image can be accurately reconstructed), the subject velocity had to be known a priori. In addition, various limiting assumptions had to be made that restricted the classes of subject motion that can be tolerated, e.g. linear and constant velocity motion. Method 400 and system 100 capture images with invertible motion blur for subjects with more general motion profiles, and in cases where the motion cannot be known/predicted a priori.

Rather than attempting to prevent motion blur using specialized hardware, systems and methods of the disclosed embodiments capture motion-blurred images, but does so in such a way as to ensure that the motion blur is invertible.

Note that the method 400 of FIG. 4, and other methodologies disclosed herein, can be implemented in the context of a computer-useable medium that contains a program product. Programs defining functions on the present invention can be delivered to a data storage system or a computer system via a variety of signal-bearing media which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems.

It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 400, for example, described herein can be deployed as process software in the context of a computer system or data-processing system as that depicted in FIGS. 1-3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" or "data-processing system" includes any data-processing apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for capturing an image of a moving subject, the method comprising:
   providing a plurality of pre-computed invertible PSFs (point spread function) searchable at rates of in-capture motion;
   capturing, using a camera image sensor, a blurred image of a moving subject;
   sensing a rate of in-capture motion of said subject;
   estimating the rate of in-capture motion of said subject from said sensing;
   successively updating in-capture positions of the moving subject in real-time based on said estimation of in-capture motion;
   selecting, from among said plurality of pre-computed invertible PSFs, a pre-computed invertible PSF for each motion estimate of the moving object; and
   modulating light integrated by said camera image sensor according to at least one of said updated pre-computed invertible PSFs such that said captured blurred image is invertible.

2. The method of claim 1, further comprising successively updating an estimated PSF in the blurred image, for controlling modulation of the camera image sensor, to correspond to each selected pre-computed invertible PSF.

3. The method of claim 1, wherein said moving subject corresponds to one among a plurality of moving objects.

4. The method of claim 1, further comprising de-blurring said invertible blurred captured image to provide a substantially sharp image.

5. The method of claim 1, wherein selecting, from among said plurality of pre-computed invertible PSFs, a pre-computed invertible PSFs for each updated position of the moving object comprises:
   searching, during capture, each pre-computed PSF among said plurality of pre-computed invertible PSFs, utilizing each updated position; and
   selecting each searched pre-computed PSF.

6. The method of claim 5, wherein providing a plurality of pre-computed invertible PSFs searchable at rates of in-capture motion comprises:
   prior to capturing said blurred image:
      computing a plurality of point spread functions (PSFs) known to be invertible; and
      arranging said plurality of computed pre-invertible PSFs such that said PSFs are searchable at the estimated rate of in-capture motion of said subject.

7. The method of claim 6, wherein arranging said plurality of computed pre-invertible PSFs such that said PSFs are searchable at the estimated rate of in-capture motion of said subject comprises arranging said plurality of pre-determined invertible PSFs in a pre-fix tree configuration.

8. A system for capturing an image of a moving subject, said system comprising:
   a processor;
   a data bus coupled to the processor; and a computer-usable medium embodying computer code, the computer-usable medium being coupled to the data bus, the computer program code comprising instructions executable by the processor and configured for:
   providing a plurality of pre-computed invertible PSFs (point spread function) searchable at rates of in-capture motion;
   capturing, using a camera image sensor, a blurred image of a moving subject; sensing, using a motion sensing device, a rate of in-capture motion of said subject;
   estimating the rate of in-capture motion of said subject from said sensing;
   successively updating in-capture positions of the moving subject in real-time based on said estimation of in-capture motion;
   selecting, from among said plurality of pre-computed invertible PSFs, a pre-computed invertible PSFs for each motion estimate of the moving object; and
   modulating light hitting said camera image sensor according to at least one pre-computed invertible PSF such that said captured blurred image is invertible.

9. The system of claim 8, wherein said instructions executable by the processor are further configured for successively updating an estimated PSF in the blurred image, for controlling modulation of the camera image sensor, to correspond to each selected pre-computed invertible PSF.

10. The system of claim 8, wherein said moving subject corresponds to one among a plurality of moving objects.

11. The system of claim 8, wherein said instructions executable by the processor for selecting, from among said plurality of pre-computed invertible PSFs, a pre-computed invertible PSFs for each updated position of the moving object comprise instructions executable by the processor for:
   searching, during capture, each pre-computed PSF among said plurality of pre-computed invertible PSFs, utilizing each updated position; and
   selecting each searched pre-computed PSF.

12. The system of claim 8, wherein said instructions executable by the processor for providing a plurality of pre-computed invertible PSFs searchable at rates of in-capture motion comprise:
   prior to capturing said blurred image:
      computing a plurality of point spread functions (PSFs) known to be invertible; and
      arranging said plurality of computed pre-invertible PSFs such that said PSFs are searchable at the estimated rate of in-capture motion of said subject.

13. The system of claim 8, wherein said instructions executable by the processor for arranging said plurality of computed pre-invertible PSFs such that said PSFs are searchable at the estimated rate of in-capture motion of said subject comprise instructions for arranging said plurality of pre-determined invertible PSFs in a pre-fix tree configuration.

14. The system of claim 8, wherein said camera image sensor comprises a flutter shutter camera and/or wherein said motion sensing device comprises a high frame rate camera.

15. A non-transitory computer-usable medium for capturing an image of a moving subject, said computer-usable medium embodying computer program code, said computer program code comprising computer executable instructions configured for:
   providing a plurality of pre-computed invertible PSFs (point spread function) searchable at rates of in-capture motion;
   capturing, using a camera image sensor, a blurred image of a moving subject;
   sensing a rate of in-capture motion of said subject;
   estimating the rate of in-capture motion of said subject from said sensing;
   successively updating in-capture positions of the moving subject in real-time based on said estimation of in-capture motion;
   selecting, from among said plurality of pre-computed invertible PSFs, a pre-computed invertible PSFs for each estimate motion of the moving object; and
   modulating light hitting said camera image sensor according to at least one updated pre-computed invertible PSFs such that said captured blurred image is invertible.

16. The computer-usable medium of claim 15, wherein said instructions executable by the processor are further configured for successively updating an estimated PSF in the blurred image, for controlling modulation of the camera image sensor, to correspond to each selected pre-computed invertible PSF.

17. The computer-usable medium of claim 15, wherein said moving subject corresponds to one among a plurality of moving objects.

18. The computer-usable medium of claim 15, wherein said instructions executable by the processor are further configured for de-blurring said invertible blurred captured image to provide a substantially sharp image.

19. The computer-usable medium of claim 15, wherein said instructions executable by the processor for selecting, from among said plurality of pre-computed invertible PSFs, a pre-computed invertible PSFs for each updated position of the moving object comprise instructions for:
   searching, during capture, each pre-computed PSF among said plurality of pre-computed invertible PSFs, utilizing each updated position; and
   selecting each searched pre-computed PSF.

20. The computer-usable medium of claim 15, wherein said instructions executable by the processor for providing a plurality of pre-computed invertible PSFs searchable at rates of in-capture motion comprise:
   prior to capturing said blurred image:
      computing a plurality of point spread functions (PSFs) known to be invertible; and
      arranging said plurality of computed pre-invertible PSFs such that said PSFs are searchable at the estimated rate of in-capture motion of said subject.

* * * * *